United States Patent
Sandberg et al.

(10) Patent No.: US 7,024,226 B2
(45) Date of Patent: Apr. 4, 2006

(54) METHOD FOR ENABLING PKI FUNCTIONS IN A SMART CARD

(75) Inventors: Leif Sandberg, Saltsjo-bo (SE); Kjell Rodberg-Larsen, Hebekk (NO)

(73) Assignee: Telenor ASA, Fornebu (NO)

( * ) Notice: Subject to any disclaimer, the term of this patent is extended or adjusted under 35 U.S.C. 154(b) by 182 days.

(21) Appl. No.: 10/466,486

(22) PCT Filed: Jan. 23, 2002

(86) PCT No.: PCT/NO02/00035

§ 371 (c)(1),
(2), (4) Date: Sep. 15, 2003

(87) PCT Pub. No.: WO02/060210

PCT Pub. Date: Aug. 1, 2002

(65) Prior Publication Data

US 2004/0053642 A1    Mar. 18, 2004

(30) Foreign Application Priority Data

Jan. 24, 2001 (NO) .................................. 20010427

(51) Int. Cl.
*H04B 1/38* (2006.01)
*H04L 9/00* (2006.01)

(52) U.S. Cl. ....................... 455/558; 713/171

(58) Field of Classification Search ................ 713/171; 455/411, 410, 558
See application file for complete search history.

(56) References Cited

U.S. PATENT DOCUMENTS

| | | | |
|---|---|---|---|
| 5,557,679 A * | 9/1996 | Julin et al. | 380/249 |
| 5,953,422 A | 9/1999 | Angelo et al. | 380/23 |
| 6,711,262 B1 * | 3/2004 | Vatanen | 380/277 |
| 6,848,048 B1 * | 1/2005 | Holmes | 713/162 |
| 6,915,124 B1 * | 7/2005 | Kiessling et al. | 455/411 |
| 2002/0042879 A1 * | 4/2002 | Gould et al. | 713/176 |
| 2002/0176582 A1 * | 11/2002 | Aull | 380/279 |

FOREIGN PATENT DOCUMENTS

| | | |
|---|---|---|
| DE | 198 20 422 A1 | 11/1999 |
| WO | WO 98/33343 | 7/1998 |
| WO | WO 9901848 A1 * | 1/1999 |
| WO | WO 00/24218 | 4/2000 |
| WO | WO 00/54457 | 9/2000 |

\* cited by examiner

*Primary Examiner*—Sonny Trinh
*Assistant Examiner*—Marivelisse Santiago-Cordero
(74) *Attorney, Agent, or Firm*—Schneck & Schneck; Thomas Schneck

(57) ABSTRACT

A method for enabling at least a part of a Smart Card (e.g. SIM card) is described where a one time activation code is generated in a server at a telephone operator. The activation code is sent via registered mail to a Smart Card user, in a cellular phone. When the user enters the activation code into the phone, the entry is transmitted to the server for verification. Upon successful verification, the server transmits an enabling command to the phone, thus enabling the intended part of the SIM card. This may enable PKI functionalities until now hidden in the SIM card and thus unavailable for the user. The user may then choose his signing PIN for authentication, encryption and transaction signing. In case of enabling PKI functions, all necessary generation of private and public keys and establishment of certifications are carried through when the activation code is verified.

11 Claims, 1 Drawing Sheet

METHOD FOR ENABLING PKI FUNCTIONS IN A SMART CARD

FIELD OF THE INVENTION

The present invention is related to Smart Cards and communication network, in particular a mobile telephone system using a one time activation code for activating at least a part of a Smart Card, e.g. PKI (Public Key Infrastructure) function in a SIM (Subscriber Identity Module) card.

BACKGROUND OF THE INVENTION

PKI functions in a Smart Card, e.g. a SIM card localized in a GSM cellular phone, is normally protected by its own PIN code and PUK (Personal Unblocking Code) code (not the same as for the GSM part). The PIN code is normally a relatively short personal number which has to be entered to enable the card for use. The PUK code is normally a much longer number which has to be entered after three times of incorrectly entry of the PIN code. This prevents unauthorized access to the Smart Card.

For security reasons the PUK code must be considerably longer than the PIN code. However, this emerges as a problem for the user because the code is difficult to remember. For most users it is necessary to store the PUK code e.g. on a piece of paper, and on rare occasions, when the PUK code is needed, it may probably be gone. Due to this, mobile telephone operators (or any other type of issuer) frequently have to replace the users Smart Card/SIM. Because of security reasons, it is not a proper handling to reprint a PUK twice. This will imply extra cost and work to renew the subscription with a new PUK and a Smart Card as well.

The PUK code is a fixed code, thus requiring storage of the code locally in the Smart Card. An additional problem due to the fact that the PUK code is a fixed code, is that the Smart Card is tied up to one user during its life time, and there is no possibility for changing the user for a certain subscription. This implies manufacturing and distribution of more Smart Card than necessary.

SUMMARY OF THE INVENTION

It is an object of the present invention to provide a method that eliminates the drawbacks described above. The features defined in the claims enclosed characterize this method.

More specifically, according to the present invention an activation code replacing the PUK code is generated centrally and will be send preferably by registered mail to the user of the Smart Card that may be a SIM card localized in a cellular phone. The verification of the activation code is carried through simply by comparing (e.g. in a server of a telephone operator) the user entered activation code with the previously mailed one, which also is stored in the telephone operators activation server. The activation code is a one time code, and replaces all the functions of the PUK code for the PKI function. Additionally it may be used to enable stored, but for the user previously hidden, functionalities in the Smart Card, e.g. PKI functionalities.

DETAILED DESCRIPTION

Figure 1:
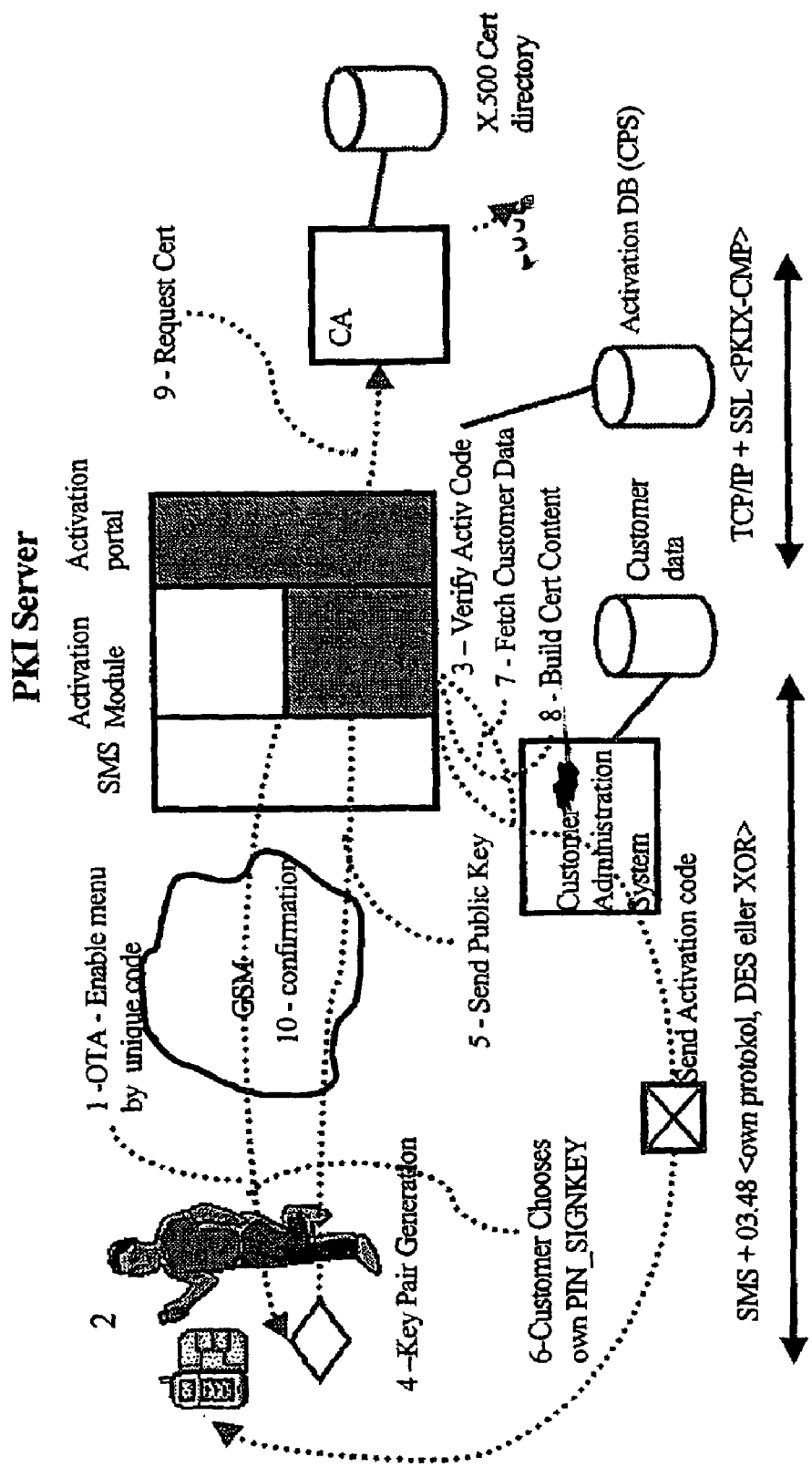
FIG. 1 is a view of the components and the data flow in an embodiment of the present invention.

The present invention will now be described in conjunction with an example embodiment referring to the above mentioned figure. However, the present invention is not limited to this particular embodiment, but may be used in other applications with various substitutions without departing from the scope of the invention as defined in the enclosed claims.

The example embodiment is based upon a mobile telephone network wherein the fixed PUK codes are replaced with one time activation codes. In addition to replacing the traditional functions of the PUK code, the activation code may also be used to enable PKI functionalities stored in the SIM cards of the subscribers.

To make use of PKI functionalities, a user must in advance be registered and registration data must be verified at an RA (Registration Authority). All relevant registration data must be available for the server generating activation codes, typically a server localized at a telephone operator.

After successful registration, the user may then be provided with a one time activation code which is generated in the server. This code will be used to authenticate the user towards the server after the registration and to initiate the key generation process into the Smart Card. The one time activation code will be provided to the user in a sealed envelope that is sent by post, e.g. as a registered letter to the home address of the user.

However, before the user may enter the activation code, a "SIM PKI menu" must be enabled. Thus, the PKI server transmits a—for the user's SIM card unique—code to the users phone to enable the "SIM PKI menu". This unique code should not be confused with the actual activation code described above. This "SIM PKI menu", have until now been resting invisibly in the SIM card not accessible to the user. The Activation Module in the PKI server will also fetch some unique parameters from the Card Production system, which also is stored in the particular SIM to be used as code for enable PKI menu in the SIM.

When the "SIM PKI menu" is enabled, the user enters the activation code in his/her handset to enroll to the service. The activation code is sent by SMS to the PKI Server. The user has 3 attempts to enter this code correctly.

The Activation Module verifies that the entered activation code corresponds to the one previously transmitted one. The Activation Module then transmits a "Generate PKI keys enabling command" back to the SIM, and the key generation application in the SIM will generate key pairs comprising private key and verification public key.

The verification public key (VPuK) is transmitted by SMS to the Activation Module, and the SMS is preferably encrypted according to GSM 03.48 for protection of sensitive information.

The user is then requested to choose a PIN_SIGNKEY, which is a personal self chosen signing key used for e.g. transaction signing, encryption and authentication.

In the case of successful verification, the Activation Portal connects to the CA to issue a valid certificate with the public key associated with the user. This certificate is at the same time sent to a certification directory.

A confirmation of successful certification is sent back to the user and the PKI menu will then be disabled in the SIM. The PKI functions in the SIM card are now enabled.

The present invention replaces the PUK code for the PKI part (not to be confused with that one for the GSM part), which is usually, for security reasons, stored in two separated parts, with a one time activation code thus saving memory space and administration.

In addition, the present invention introduces a higher degree of security as no PUK is being stored neither centrally at the operator, nor in the terminal or on a piece of paper for the user to remember.

The present invention enables generating keys in connection with use of PKI, thus allowing the user to choose the signing PIN for authentication and transaction signing himself.

A further advantage with the present invention is that SIM cards may be reused for the user or for a new user then the PKI certificate renewal date (within 2–3 years) since new PKI data will be generated in the Smart Card for each new activation code.

The above-described example of the present invention is for is illustrative purposes only. Other implementations and variations may be utilized without departing from the scope of the invention as defined in the following claims.

What is claimed is:

1. A method for enabling at least a part of a Smart Card, said Smart Card associated to a terminal, said terminal connected to a communication network to which a server also is connected, said Smart Card accessible for a user of said terminal, comprising the following steps:
    generating an activation code in said server;
    providing said user with said activation code;
    transmitting to said terminal through said communication network a unique code associated with said Smart Card, said unique code adapting said terminal to prompt said user for his/her reading of said activation code;
    in response to an entry by said user of said reading of said activation code into said terminal, transmitting said entered activation code to said server through said communication network;
    in response to receiving said entered activation code by said server, comparing said received activation code with the activation code as provided to said user;
    if said received activation code and said activation code provided to said user correspond, transmitting an enabling command to said terminal through said communication network; and
    upon receiving said enabling command, enabling said at least a part of said Smart Card.

2. The method according to claim 1, wherein said part of said Smart Card is Public Key Infrastructure functions and said server is a Public Key Infrastructure server.

3. The method according to claim 2, wherein the step of enabling further includes the following steps:
    generating a key pair including a private key and a public key;
    requesting said user to choose and enter a signing, encryption and authentication PIN into said terminal;
    transmitting said public key to said Public Key Infrastructure server through said communication network; and
    from said Public Key Infrastructure server, requesting a certificate for said user from a Certificate Authority.

4. The method according to claim 3, wherein said Public Key Infrastructures functions is stored in said Smart Card, but hidden for the user until enabling.

5. The method according to claim 2, wherein said Public Key Infrastructure functions is stored in said Smart Card, but hidden for the user until enabling.

6. The method according to claim 1, wherein the step of adapting includes transmitting a menu enabling code to said terminal from said server providing said terminal with a menu for said prompting of said user for said reading of said activation code.

7. The method according to claim 1, wherein said communication network is a GSM network, said terminal is a GSM mobile telephone, and said Smart Card is a Subscriber Identity Module card.

8. The method according to claim 7, wherein said transmitting of said entered activation code from said terminal to said server is carried through via a short message service.

9. The method according to claim 8, wherein said activation code completely replaces a Personal Unblocking Code used for Public Key Infrastructure.

10. The method according to claim 7, wherein said activation code completely replaces a Personal Unblocking Code used for Public Key Infrastructure.

11. The method according to claim 1, wherein said activation code is sent to the user via registered mail.

* * * * *